S. F. HALL.
VEHICLE SPRING SNUBBER.
APPLICATION FILED APR. 2, 1917.
1,267,070.
Patented May 21, 1918.
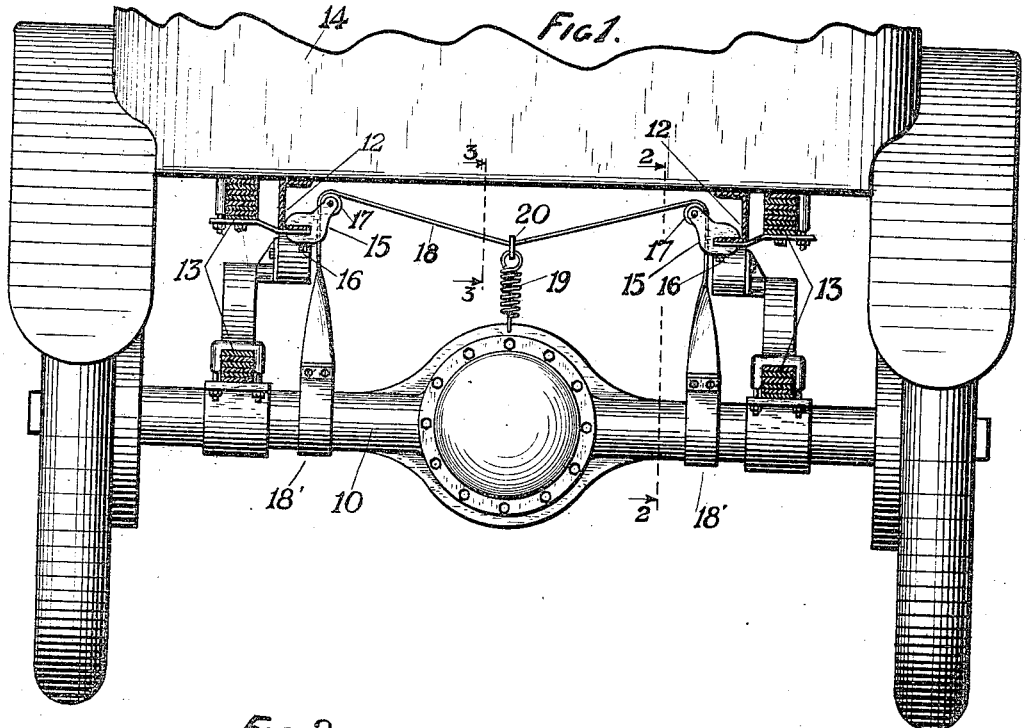
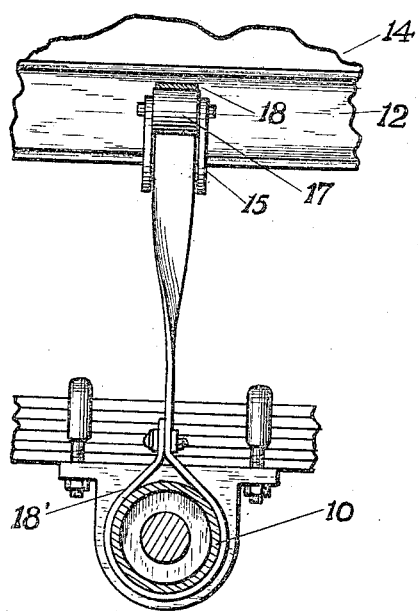
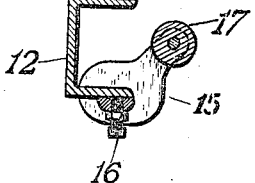
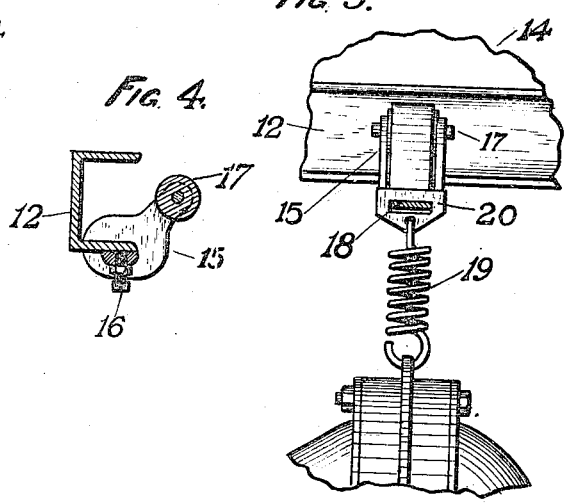
WITNESSES
INVENTOR
Spencer F. Hall,
By R. S. Caldwell
ATTORNEY

UNITED STATES PATENT OFFICE.

SPENCER F. HALL, OF RACINE, WISCONSIN.

VEHICLE-SPRING SNUBBER.

1,267,070.   Specification of Letters Patent.   Patented May 21, 1918.

Application filed April 2, 1917.   Serial No. 159,235.

*To all whom it may concern:*

Be it known that I, SPENCER F. HALL, a citizen of the United States, and resident of Racine, in the county of Racine and State of Wisconsin, have invented new and useful Improvements in Vehicle-Spring Snubbers, of which the following is a description, reference being had to the accompanying drawings, which are a part of this specification.

This invention has for its object to provide a snubber for use on automobiles and the like for yieldingly checking the rebound of the car body or axle after the springs have been depressed to a considerable degree and are suddenly released. It is a well recognized fact that the danger of breaking vehicle springs of the usual multiple leaf elliptical type lies more particularly in the recoil of the spring, so that snubbers which restrict the rebound form the most serviceable shock absorbing protection.

The present invention has for its object to provide such a snubbing device which will protect the springs against breakage and which will minimize the spring rebound movement of the car body to give it easier riding qualities.

With the above and other objects in view the invention consists in the spring snubber as herein claimed and all equivalents.

Referring to the accompanying drawings, in which like characters of reference indicate the same parts in the different views:

Figure 1 is a rear view of an automobile provided with the spring snubber of this invention, portions of the springs and frame being broken away;

Fig. 2 is a sectional view on the plane of line 2—2 of Fig. 1;

Fig. 3 is a sectional view on the plane of line 3—3 of Fig. 1; and,

Fig. 4 is a detail sectional view of one of the roller brackets.

In these drawings 10 indicates the rear axle housing of an automobile, a frame 12 being mounted thereon by means of springs 13 as usual and carrying the body 14.

Brackets 15 formed of side plates slotted to fit the lower flange of the channel iron frame and connected by a cross bar carrying a set screw 16 engaging the said flange are thus securely mounted on each side of the frame and support rollers 17 over which a strap 18 passes. The strap 18 has loops 18' formed at its ends and passing around the axle housing 10 on either side of the differential gear casing. Between its ends the strap passes up around the rollers 17 and is stretched between them. The length of the strap is such that the portion between the rollers 17 is nearly straight in the normal position of the springs. It will be understood that as the springs are compressed greater slack is given to the strap, but as they recoil the strap becomes taut to limit the spread of the springs. In order that this restriction to the expansion of the springs may be gradually applied, and in order that the strap may be kept taut at all times, a coil spring 19 connects the center of the span between the rollers 17 with the rear axle housing or differential gear casing, as shown. For this purpose a metal slide 20, having an opening threaded on the strap, is also provided with a similar opening through which the end of the spring 19 is passed, the other end of the spring being engaged with an opening in a flange of the axle housing.

In operation the snubber strap of this invention is free to slide endwise without restricting tilting movements of the rear axle as when one wheel or the other drops into a rut or rides over obstructions, but when there is a violent compression of the springs, as when both rear wheels strike an obstruction or drop into a hole at the same time, the following rebound, which is usually responsible for the breaking of springs, is snubbed or checked by the strap limiting the relative movement between the rear axle housing and the body and so preventing expansion of the springs to a degree that would be liable to injure them and also preventing a tossing movement of the car body to the discomfort of the passengers. The spring 19 being connected with the strap so as to exert its action thereon midway between the rollers 17 is effective for resisting the expansion of the springs before the limit is reached, for as the strap approaches the limit and becomes more nearly straight between the rollers 17 the spring 19 is stretched and its pull on the strap at this point makes it very effective for resisting the expansion of the springs before the limit is reached by the strap becoming perfectly tight.

In the operation of the snubber in traveling over rough roads that movement of the axle which results from one wheel rising or dropping independently of the other, or of the two wheels moving in opposite directions, is unresisted by the snubber strap until a predetermined aggregate length of the two portions of the strap connecting the frame with the axle is reached, whereupon further expansion of the expanding spring will be resisted by the strap.

A very desirable feature of the device as shown is the fact that it is suitable for attachment to any automobile and does not have to be built into the car but may form an attachment therefor if desired.

It is also to be understood that the invention is not limited to its use with the rear axle of an automobile for it may be equally well applied to the front axle in the same manner.

The term strap is herein used for convenience to designate any coupling suitable for the purpose, for it is obvious that a chain or cable or other device having the desired tensile strength may be substituted.

For convenience the term body and the term frame are used in the claims in a broad sense which will include the frame or any other part connected with the body. Also the term axle as used in the claims is intended to comprehend the axle housing or the spring or any other part rigidly connected with the axle.

It is obvious that the spring may be suited in any particular case to properly respond to the load on the vehicle.

What I claim as new and desire to secure by Letters Patent is:

1. A snubber for vehicles, comprising a flexible connection between an axle and the body at each side of the body, said flexible connections being connected together to permit a variation in length of one to be compensated by the other, but limiting the expansion of the springs when reaching a predetermined aggregate length.

2. A snubber for vehicles, comprising a frame and an axle forming two members movable with relation to each other to a greater degree on one side of the vehicle than on the other and with springs interposed between them, a non-extensible flexible strap with its ends secured to one member on opposite sides of the vehicle and its intermediate portion having sliding connection with the other member on the opposite side of the vehicle and positively limiting the aggregate expansion of the springs.

3. In a vehicle having an axle, a frame, and springs connecting the axle and frame, a snubber for the springs consisting of a non-extensible strap with its ends secured to the respective ends of the axle and its intermediate portion slidably connected with the frame on opposite sides of the vehicle serving to positively limit the expansion of the springs.

4. In a vehicle having an axle, a frame, and springs connecting the axle and frame, a snubber for the springs consisting of a non-extensible strap with its ends secured to the respective ends of the axle and its intermediate portion slidably connected with the frame on opposite sides of the vehicle, and means engaging the strap between its points of engagement with the frame for giving tension thereto, said strap positively limiting the expansion of the vehicle springs.

5. In a vehicle having an axle, a frame, and springs connecting the axle and frame, a snubber for the springs consisting of a strap with its ends secured to the respective ends of the axle and its intermediate portion slidably connected with the frame on opposite sides of the vehicle, and a spring engaging the strap between its points of engagement with the frame for giving tension thereto.

6. In a vehicle having an axle, a frame and springs connecting the axle and frame, a snubber for the springs consisting of a strap with its ends secured to the respective ends of the axle and its intermediate portion slidably connected with the frame on opposite sides of the vehicle, and a spring connecting the axle with the strap at a point between its points of engagement with the frame.

7. A vehicle having an axle and a frame and springs connecting the axle and the frame, a snubber consisting of a strap with its ends looped around the ends of the axle, roller brackets engaging the flanges of the frame, rollers thereon around which the strap passes, a slide on the strap between the rollers, and a spring connecting the slide with the axle.

8. In a vehicle having an axle and a frame and springs connecting the axle and frame, a snubber consisting of a strap with its ends connected to the ends of the axle, slotted brackets fitting on the flanges of the frame, set screws thereon for engaging said flanges, rollers mounted on the brackets and having the strap passed therearound, a slide on the strap between the rollers, and a spring connecting the slide with the axle.

In testimony whereof, I affix my signature, in presence of two witnesses.

SPENCER F. HALL.

Witnesses:
R. S. C. CALDWELL,
H. D. CHASE.